(12) United States Patent
Bburton et al.

(10) Patent No.: US 8,067,652 B2
(45) Date of Patent: *Nov. 29, 2011

(54) PROCESSES FOR CONTROLLING THE VISCOSITY OF POLYALPHAOLEFINS

(75) Inventors: Willie C. Bburton, Zachary, LA (US); E. Brian Fox, Monroe, CT (US)

(73) Assignee: Chemtura Corporation, Middlebury, CT (US)

( * ) Notice: Subject to any disclaimer, the term of this patent is extended or adjusted under 35 U.S.C. 154(b) by 79 days.

This patent is subject to a terminal disclaimer.

(21) Appl. No.: 12/540,974

(22) Filed: Aug. 13, 2009

(65) Prior Publication Data

US 2011/0040052 A1 Feb. 17, 2011

(51) Int. Cl.
*C07C 2/08* (2006.01)
*C08F 4/6592* (2006.01)

(52) U.S. Cl. .......... 585/18; 585/523; 526/133; 526/134; 526/160; 526/165; 526/348.2; 526/348.3; 526/943

(58) Field of Classification Search .............. 585/18, 585/520, 523; 526/133, 134, 160, 165, 348.2, 526/348.3, 943
See application file for complete search history.

(56) References Cited

U.S. PATENT DOCUMENTS

| | | |
|---|---|---|
| 4,752,597 A | 6/1988 | Turner |
| 4,892,851 A | 1/1990 | Ewen et al. |
| 4,931,417 A | 6/1990 | Miya et al. |
| 4,931,517 A | 6/1990 | Fujita |
| 4,933,403 A | 6/1990 | Kaminsky et al. |
| 5,001,205 A | 3/1991 | Hoel |
| 5,017,714 A | 5/1991 | Welborn, Jr. |
| 5,026,798 A | 6/1991 | Canich |
| 5,034,549 A | 7/1991 | Piotrowski et al. |
| 5,036,034 A | 7/1991 | Ewen |
| 5,055,438 A | 10/1991 | Canich |
| 5,064,802 A | 11/1991 | Stevens et al. |
| 5,086,134 A | 2/1992 | Antberg et al. |
| 5,087,677 A | 2/1992 | Brekner et al. |
| 5,126,301 A | 6/1992 | Tsutsui et al. |
| 5,126,303 A | 6/1992 | Resconi et al. |
| 5,132,262 A | 7/1992 | Rieger et al. |
| 5,132,380 A | 7/1992 | Stevens et al. |
| 5,132,381 A | 7/1992 | Winter et al. |
| 5,145,819 A | 9/1992 | Winter et al. |
| 5,153,157 A | 10/1992 | Hlatky et al. |
| 5,155,080 A | 10/1992 | Elder et al. |
| 5,225,501 A | 7/1993 | Fujita et al. |
| 5,227,478 A | 7/1993 | Koch |
| 5,241,025 A | 8/1993 | Hlatky et al. |
| 5,243,002 A | 9/1993 | Razavi |
| 5,278,119 A | 1/1994 | Turner et al. |
| 5,278,265 A | 1/1994 | Razavi |
| 5,281,679 A | 1/1994 | Jejelowo et al. |
| 5,296,434 A | 3/1994 | Karl et al. |
| 5,304,614 A | 4/1994 | Winter et al. |
| 5,324,800 A | 6/1994 | Welborn, Jr. et al. |
| 5,328,969 A | 7/1994 | Winter et al. |
| 5,329,031 A | 7/1994 | Miyake et al. |
| 5,330,948 A | 7/1994 | Marks et al. |
| 5,331,057 A | 7/1994 | Brekner et al. |
| 5,349,032 A | 9/1994 | Miyake et al. |
| 5,372,980 A | 12/1994 | Davis |
| 5,374,753 A | 12/1994 | Yamada et al. |
| 5,385,877 A | 1/1995 | Fujita et al. |
| 5,391,629 A | 2/1995 | Turner et al. |
| 5,391,789 A | 2/1995 | Rohrmann |
| 5,399,636 A | 3/1995 | Alt et al. |
| 5,401,817 A | 3/1995 | Palackal et al. |
| 5,406,013 A | 4/1995 | Patsidis et al. |
| 5,416,177 A | 5/1995 | Siedle et al. |
| 5,416,178 A | 5/1995 | Winter et al. |
| 5,416,228 A | 5/1995 | Ewen et al. |
| 5,427,991 A | 6/1995 | Turner |
| 5,439,994 A | 8/1995 | Inoue et al. |
| 5,441,920 A | 8/1995 | Welborn, Jr. |
| 5,442,020 A | 8/1995 | Davis |
| 5,449,651 A | 9/1995 | Reddy et al. |
| 5,453,410 A | 9/1995 | Kolthammer et al. |
| 5,455,365 A | 10/1995 | Winter et al. |
| 5,455,366 A | 10/1995 | Rohrmann et al. |
| 5,459,117 A | 10/1995 | Ewen |
| 5,466,649 A | 11/1995 | Jejelowo |
| 5,470,811 A | 11/1995 | Jejelowo et al. |
| 5,470,927 A | 11/1995 | Turner et al. |
| 5,477,895 A | 12/1995 | Willard |
| 5,491,205 A | 2/1996 | Langhauser et al. |
| 5,491,207 A | 2/1996 | Hoel |
| 2003/0125595 A1 * | 7/2003 | Bagheri et al. ............... 585/520 |
| 2006/0116303 A1 * | 6/2006 | Iimura et al. ................. 508/591 |
| 2008/0171651 A1 * | 7/2008 | Tohi et al. .................... 502/117 |
| 2009/0198089 A1 | 8/2009 | Burton et al. |
| 2009/0281360 A1 * | 11/2009 | Knowles et al. ............... 585/12 |

* cited by examiner

Primary Examiner — Caixia Lu
(74) Attorney, Agent, or Firm — Joseph Suhadolnik

(57) ABSTRACT

The invention relates to a process for forming a polyalphaolefin, the process comprising the step of polymerizing at least one $C_8$-$C_{12}$ monomer, preferably a decene such as 1-decene, in the presence of an aluminoxane, an activator and a metallocene to form the polyalphaolefin, wherein the molar ratio of the aluminoxane to the metallocene is less than 250:1. The invention also relates to a process for forming a polyalphaolefin having a desired kinematic viscosity from at least one monomer in the presence of an aluminoxane, an organoboron compound and a metallocene. The process comprises the steps of, inter alia, providing a correlation between (i) the molar ratio of the aluminoxane to at least one of the organoboron compound and the metallocene, and (ii) the kinematic viscosity of the polyalphaolefin to form polyalphaolefins having predictable viscosities.

58 Claims, 2 Drawing Sheets

PROCESSES FOR CONTROLLING THE VISCOSITY OF POLYALPHAOLEFINS

FIELD OF THE INVENTION

This invention relates to the preparation of polyalphaolefins using a metallocene procatalyst and an aluminoxane cocatalyst. Specifically, the invention relates to controlling the viscosity of polyalphaolefins by adjusting the molar ratios of the aluminoxane cocatalyst relative to the metallocene procatalyst and optionally an activator such as an organoboron compound.

BACKGROUND OF THE INVENTION

Catalytic oligomerization of olefins is a known technique for manufacturing hydrocarbon basestocks useful as lubricants. Efforts to improve upon the performance of natural mineral oil based lubricants by the synthesis of oligomeric hydrocarbon fluids have been the subject of important research and development in the petroleum industry for several decades, leading to recent commercial production of a number of superior polyalphaolefin (hereinafter referred to as "PAO") synthetic lubricants. These materials are primarily based on the oligomerization of alphaolefins such as $C_6$-$C_{12}$ olefins. Industrial research efforts on synthetic lubricants has generally focused on fluids exhibiting useful viscosities over a wide range of temperatures, i.e., improved viscosity index (VI), while also showing lubricity, thermal and oxidative stability and pour point equal to or better than mineral oil. These newer synthetic lubricants provide lower friction and hence increase mechanical efficiency across the full spectrum of mechanical loads and do so over a wider range of operating conditions than mineral oil lubricants.

Well known structural and physical property relationships for high polymers have pointed the way to alphaolefins as a fruitful field of investigation for the synthesis of oligomers with the structure believed to be necessary to confer improved lubricant properties thereon. Due largely to studies on the polymerization of propene and vinyl monomers, the mechanism of the polymerization of alphaolefins and the effect of that mechanism on polymer structure is reasonably well understood, providing a strong resource for targeting on potentially useful oligomerization methods and oligomer structures. Building on that resource, oligomers of alphaolefins from 6 to 12 carbon atoms have been prepared with commercially useful synthetic lubricants from, e.g., 1-decene oligomerization, yielding a distinctly superior lubricant product via either cationic or Ziegler catalyzed polymerization.

A significant problem in the manufacture of synthetic lubricants is the production of lubricants in a preferred viscosity range (especially at low temperatures), in good yield, and without excessive catalyst deactivation. Methods to control the viscosity index are sought after in the art to overcome the problems in the manufacture of, particularly, lower viscosity lubricants.

SUMMARY OF THE INVENTION

It has now been found that an efficient way to prepare lubricants with good viscometric properties is by forming PAOs using a metallocene procatalyst, an aluminoxane cocatalyst, e.g., an alkylaluminoxane such as triisobutylaluminoxane or methylaluminoxane, and an activator, e.g., an organoboron compound preferably a borate compound, by decreasing the molar ratio of the aluminoxane cocatalyst relative to either or both the metallocene procatalyst and/or the activator. Moreover, it has been discovered that the viscometric properties of PAO polymers may be carefully controlled by controlling the molar ratios of the procatalyst, the cocatalyst and the activator.

In one embodiment, the invention relates to a process for forming a polyalphaolefin, the process comprising the step of polymerizing at least one $C_8$-$C_{12}$ monomer, preferably 1-decene, in the presence of an aluminoxane, an activator and a metallocene to form the polyalphaolefin, wherein the molar ratio of the aluminoxane to the metallocene is less than 250:1, e.g., less than 100:1, less than 50:1 or less than 25:1.

In another embodiment, the invention is to a process for forming a polyalphaolefin, the process comprising the step of polymerizing at least one $C_8$-$C_{12}$ monomer, preferably 1-decene, in the presence of an aluminoxane, an organoboron compound, and a metallocene to form the polyalphaolefin, wherein the molar ratio of the aluminoxane to the combination of the organoboron compound and the metallocene is less than 125:1, e.g., less than 100:1, less than 50:1, less than 25:1 or less than 12.5:1.

In another embodiment, the invention is to a process for forming a polyalphaolefin having a desired kinematic viscosity from at least one $C_8$-$C_{12}$ monomer, preferably 1-decene, in the presence of an aluminoxane, a metallocene, and optionally an organoboron compound, the process comprising the steps of: (a) providing a correlation between (i) the molar ratio of the aluminoxane to the metallocene, and (ii) the kinematic viscosity of the polyalphaolefin; (b) determining, from the correlation, a target molar ratio of the aluminoxane to the metallocene that will yield a desired kinematic viscosity of the polyolefin; (c) forming a reaction mixture comprising the at least one monomer, the aluminoxane, the metallocene and optionally the organoboron compound, wherein the relative ratio of the aluminoxane to the metallocene in the reaction mixture corresponds to the target molar ratio; and (d) polymerizing the at least one monomer in the reaction mixture to form the polyalphaolefin having the desired kinematic viscosity.

In another embodiment, the invention is to a process for forming a polyalphaolefin having a desired kinematic viscosity from at least one $C_8$-$C_{12}$ monomer, preferably 1-decene, in the presence of an aluminoxane, a metallocene, and an organoboron compound, the process comprising the steps of: (a) providing a correlation between (i) the molar ratio of the aluminoxane to the combination of the metallocene and the organoboron compound, and (ii) the kinematic viscosity of the polyalphaolefin; (b) determining, from the correlation, a target molar ratio of the aluminoxane to the combination of the metallocene and the organoboron compound that will yield a desired kinematic viscosity of the polyolefin; (c) forming a reaction mixture comprising the at least one monomer, the aluminoxane, the metallocene and the organoboron compound, wherein the relative molar ratio of the aluminoxane to the combination of the metallocene and the organoboron compound in the reaction mixture corresponds to the target molar ratio; and (d) polymerizing the at least one monomer in the reaction mixture to form the polyalphaolefin having the desired kinematic viscosity.

In another embodiment, the invention is to a process for forming a polyalphaolefin having a desired kinematic viscosity from at least one $C_8$-$C_{12}$ monomer, preferably 1-decene, in the presence of an aluminoxane, a metallocene, and an organoboron compound, the process comprising the steps of: (a) providing a correlation between (i) the molar ratio of the aluminoxane to the organoboron compound, and (ii) the kinematic viscosity of the polyalphaolefin; (b) determining, from the correlation, a target molar ratio of the aluminoxane to the organoboron compound that will yield a desired kinematic viscosity of the polyolefin; (c) forming a reaction mixture comprising the at least one monomer, the aluminoxane, the metallocene and the organoboron compound, wherein the relative molar ratio of the aluminoxane to the organoboron compound in the reaction mixture corresponds to the target molar ratio; and (d) polymerizing the at least one monomer in the reaction mixture to form the polyalphaolefin having the desired kinematic viscosity.

The polyalphaolefin formed by the inventive processes preferably has a kinematic viscosity less than 500 centiStokes, e.g., less than 400 centiStokes, less than 300 centiStokes or less than 200 centiStokes.

The procatalyst employed preferably is a metallocene compound of the formula:

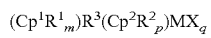

wherein Cp1 of ligand $(Cp^1R^1_m)$ and Cp2 of ligand $(Cp^2R^2_p)$ are the same or different cyclopendadienyl rings; $R^1$ and $R^2$ each is, independently, a hydrocarbyl, halocarbyl, heterocarbyl, hydrocarbyl-substituted organometalloid or halocarbyl-substituted organometalloid group containing up to 20 carbon atoms; m is an integer from 0 to 5; p is an integer from 0 to 5; two $R^1$ and/or $R^2$ substituents on adjacent carbon atoms of the cyclopentadienyl ring associated therewith can be joined together to form a ring fused to the cyclopentadienyl ring, the fused ring containing from 4 to 20 carbon atoms; $R^3$ is a bridging group bridging $Cp^1$ and $Cp^2$; M is a transition metal having a valence of from 3 to 6; each X is a non-cyclopentadienyl ligand and is, independently, halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to 20 carbon atoms; and q is equal to the valence of M minus 2.

In some preferred aspects, the metallocene catalyst is a catalyst selected from the group consisting of diphenylmethylene(indenyl)(fluorenyl)zirconium dichloride; diphenylmethylene(cyclopentadienyl-9-fluorenyl)zirconium dichloride; diphenylmethylene(3-methyl-cyclopentadienyl-9-fluorenyl)zirconium dichloride; diphenylmethylene(3-ethyl-cyclopentadienyl-9-fluorenyl)zirconium dichloride; diphenylmethylene(3-propyl-cyclopentadienyl-9-fluorenyl) zirconium dichloride; diphenylmethylene(3-butyl-cyclopentadienyl-9-fluorenyl)zirconium dichloride; diphenylmethylene(cyclopentadienyl-indenyl)zirconium dichloride; diphenylmethylene(cyclopentadienyl)(4,5,6,7-tetrahydroindenyl)zirconium dichloride; diphenylmethylene(cyclopentadienyl)(2-methylindenyl)zirconium dichloride; diphenylmethylene(cyclopentadienyl)(2-phenylindenyl)zirconium dichloride; diphenylmethylene(2,4-dimethylcyclo-pentadienyl)(3',5'-dimethylcyclopentadienyl)zirconium dichloride; diphenylmethylene(2-methyl-4-tert-butylcyclo-pentadienyl)(3'-tert-butyl-5'-methylcyclopentadienyl)zirconium dichloride; dixylylmethylene(2,3,5-trimethylcyclopentadienyl)(2',4',5'-trimethylcyclopentadienyl)zirconium dichloride; dixylylmethylene(2,4-dimethylcyclopentadienyl)(3',5'-dimethylcyclopentadienyl)zirconium dichloride; dixylylmethylene(2-methyl-4-tert-butylcyclopentadienyl)(3'-tert-butyl-5-methylcyclopentadienyl)zirconium dichloride; dixylylmethylene(cyclopentadienyl)(fluorenyl)zirconium dichloride; di-o-tolylmethylene(cyclopentadienyl)(3,4-dimethyl-cyclopentadienyl)zirconium dichloride; di-o-tolylmethylene(cyclopentadienyl)(3,4-dimethyl-cyclopentadienyl) zirconium dichloride; di-o-tolylmethylene (cyclopentadienyl)(3,4-dimethylcyclopentadienyl) zirconium dichloride; di-o-tolylmethylene (cyclopentadienyl)(indenyl)zirconium dichloride; dibenzylmethylene(cyclopentadienyl)(tetramethylcyclopentadienyl)zirconium dichloride; dibenzylmethylene(cyclopentadienyl)(indenyl)zirconium dichloride; dibenzylmethylene(cyclopentadienyl)(fluorenyl)zirconium dichloride; dicyclohexylmethylene(cyclopentadienyl)(indenyl)zirconium dichloride; dicyclohexyl(cyclopentadienyl)(fluorenyl) zirconium dichloride; dicyclohexylmethylene(2-methylcyclopentadienyl)(fluorenyl)zirconium dichloride; diphenylsilyl(2,4-dimethylcyclopentadienyl)(3',5'-dimethylcyclopentadienyl)zirconium dichloride; diphenylsilyl(2,4-dimethylcyclopentadienyl)(3',5'-dimethyl-cyclopentadienyl) zirconium dichloride; diphenylsilyl(2,3,5-trimethylcyclopentadienyl)(2,4,5-trimethylcyclopentadienyl)zirconium dichloride; tetraphenyldisilyl(cyclopentadienyl)(indenyl)zirconium dichloride; tetraphenyldisilyl(3-mothylcyclopentadienyl) (indenyl)zirconium dichloride; tetraphenyldisilyl(cyclopentadienyl)(fluorenyl)zirconium dichloride; di-o-tolylsilyl(cyclopentadienyl)(trimethylcyclopentadienyl)zirconium dichloride; di-o-tolylsilyl(cyclopentadienyl)(tetramethylcyclopentadienyl)zirconium dichloride; di-o-tolyisilyl(cyclopentadienyl)(3,4-diethylcyclopentadienyl)zirconium dichloride; di-o-tolylsilyl(cyclopentadienyl) (triethylcyclopentadienyl)zirconium dichloride; dibenzylsilyl(cyclopentadienyl)(fluorenyl)zirconium dichloride; dibenzylsilyl(cyclopentadienyl)(2,7-di-t-butyl-fluorenyl)zirconium dichloride; and dicyclohexylsilyl(cyclopentadienyl)(fluorenyl)zirconium dichloride.

In preferred embodiments, the activator compound comprises an organoboron compound selected from the group consisting of lithium tetrakis(pentafluorophenyl)borate, lithium tetrakis(trifluoromethylphenyl)borate, lithium tetrakis(3,5-di{tri-fluoromethyl}phenyl)borate, sodium tetrakis (pentafluoro-phenyl)borate, potassium tetrakis(pentafluorophenyl)borate, magnesium tetrakis(pentafluorophenyl) borate, titanium tetrakis(pentafluorophenyl)borate, tin tetrakis(pentafluorophenyl)borate, and dimethylanilinium tetrakis(pentafluorophenyl)borate. In preferred embodiments, the molar ratio of the organoboron compound to the metallocene is from 0.3:1 to 4:1, e.g., from 0.6:1 to 2:1.

BRIEF DESCRIPTION OF THE DRAWINGS

The present invention will be better understood in view of the following non-limiting figure, wherein.

DETAILED DESCRIPTION OF THE INVENTION

Figure 1:
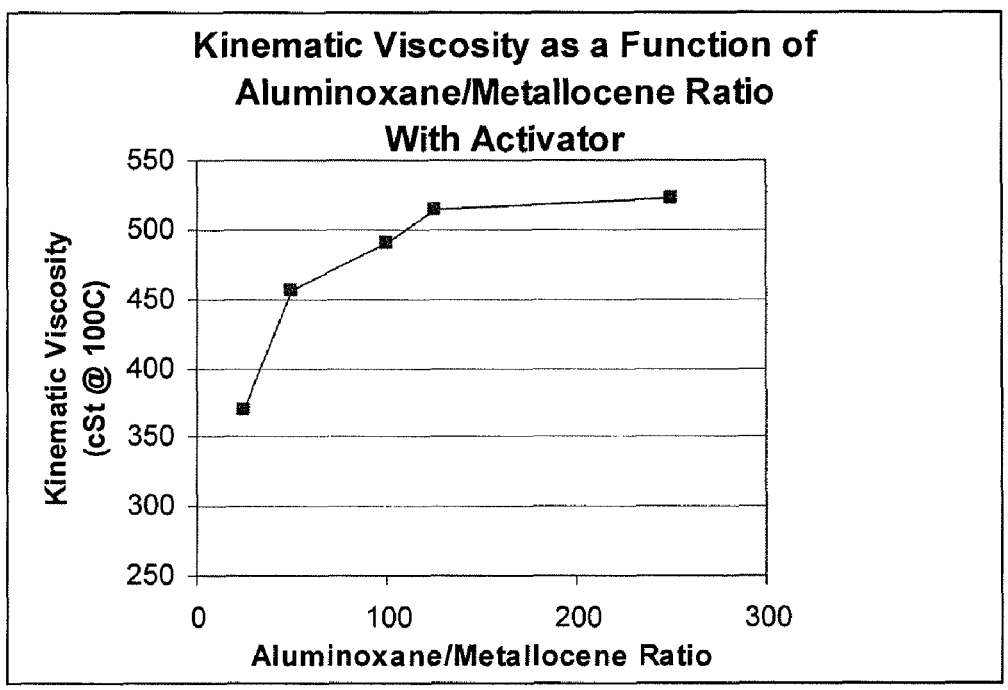
FIG. 1 is a plot of (i) the molar ratio of an aluminoxane to a metallocene, and (ii) the kinematic viscosity of a polyalphaolefin produced according to the processes of the preferred embodiments of the present invention.

The invention relates to processes for forming polyalphaolefins. In one embodiment, the process comprises the step of polymerizing at least one $C_8$-$C_{12}$ monomer, e.g., 1-octene, 1-nonene, 1-decene, 1-undecene, or 1-decene, preferably 1-decene, in the presence of an aluminoxane (e.g., methylaluminoxane (MAO)), an organoboron compound (e.g., an organoborate) and a metallocene to form the polyalphaolefin, wherein the molar ratio of the aluminoxane to the metallocene is less than 250:1, e.g., less than 100:1 or less than 25:1. It has been discovered that the viscosity of the polyalphaolefins that are prepared using such a process decreases when the molar ratio of the aluminoxane to the metallocene is decreased in contrast to a polymerization done without the organoboron compound, where the viscosity increases as MAO decreases, as well as increases in polymer yield versus non-organoboron compound polymerizations. The resulting polyalphaolefins have good viscometric properties (e.g., kinematic viscosity and Brookfield viscosity) and can be used as viscosity modifiers. An additional advantage of the process is that it utilizes less of the costly aluminoxane cocatalyst. Accordingly, the process not only produces PAOs having good viscometric properties, but it also preferably produces PAOs at reduced cost.

In another aspect, the invention relates to a process for forming a polyalphaolefin having a desired kinematic viscosity from at least one $C_8$-$C_{12}$ monomer, preferably 1-decene, in the presence of an aluminoxane, a metallocene, and an organoboron compound. In this aspect, the process comprises the steps of: (a) providing a correlation between (i) the molar ratio of the aluminoxane to at least one of the organoboron compound and the metallocene, and (ii) the kinematic viscosity of the polyalphaolefin; (b) determining, from the correlation, a target molar ratio of the aluminoxane to at least one of the organoboron compound and the metallocene that will yield a desired kinematic viscosity of the polyolefin; (c) forming a reaction mixture comprising the at least one monomer, the aluminoxane, the organoboron compound and the metallocene, wherein the relative ratios of the aluminoxane, the organoboron compound and the metallocene in the reaction mixture correspond to the target molar ratio; and (d) polymerizing the at least one monomer in the reaction mixture to form the polyalphaolefin having the desired kinematic viscosity.

In some embodiments, the correlation is between the molar ratio of the aluminoxane to the organoboron compound and the viscosity of the polyalphaolefin. The target molar ratio of the aluminoxane to the organoboron compound, in this instance, is preferably less than 250:1, e.g., less than 100:1, or less than 25:1. In another embodiment, the correlation is between the molar ratio of the aluminoxane to the metallocene and the viscosity of the polyalphaolefin. The target molar ratio of the aluminoxane to the metallocene, in this instance, preferably is less than 250:1, e.g., less than 100:1, or less than 25:1. In another embodiment, the correlation is between (i) the molar ratio of the aluminoxane to the metallocene and the organoboron compound, and (ii) the viscosity of the polyalphaolefin. The target molar ratio of the aluminoxane to the combination of the metallocene and the organoboron compound, in this instance, preferably is less than 125:1, e.g., less than 100:1, less than 50:1, less than 25:1 or less than 12.5:1.

The viscosity (e.g., kinematic viscosity) of the PAOs of the preferred embodiments of the present invention is less than 500 cSt, e.g., less than 400 cSt, or less than 300 cSt. at 100° C. using ASTM D-445. PAOs having such kinematic viscosities can be exploited in a variety of products such as, for example, products which require a viscous oil or an inert material with fluid properties. Such products include dispersants, heat transfer fluids, cosmetics or other such consumer products, and the like. The PAOs of the present invention are particularly useful as viscosity modifiers for lubricating oils wherein the PAO is employed in a viscosity-modifying amount of, e.g., from about 1 to about 99 weight percent, based on the total weight of the lubricating oil. Preferably, the PAO concentration is from about 5 to about 85 weight percent, based on the total weight of the lubricating oil.

The PAOs in the preferred embodiments are substantially amorphous meaning crystalline phases are substantially absent from the resulting polyolefin as defined by an exothermic peak observation in a differential scanning calorimetry (DSC) experiment. In addition to being substantially amorphous, the PAOs preferably possess a unique combination of low weight average molecular weight ($M_w$) (e.g., from about 1000 to about 30000, from about 2000 to about 25000 or from about 5000 to about 25000 g/mol), a low number average molecular weight ($M_n$) (e.g., from about 500 to about 15000, from about 1000 to about 12000, or from about 2500 to about 11000 g/mol), low polydispersity index ($M_w/M_n$) (e.g., from about 1.4 to about 5.0, from about 1.7 to about 3.0 or from about 1.9 to about 2.3), and a low iodine number. In addition, the kinematic viscosity of the PAOs of the preferred embodiments of the present invention can be kept low by keeping the ratio of aluminoxane to metallocene below 250:1, e.g., below 100:1, below 50:1, or below 25:1, and/or by keeping the ratio of aluminoxane to the combination of metallocene and organoboron compound to below 125:1, e.g., below 50:1, below 25:1 or below 12.5:1.

In some embodiments, the PAOs of the present invention are substantially saturated, i.e., they possess a low iodine number. In an optional embodiment, substantial saturation can be ensured by conducting the process for forming the PAOs in the presence of hydrogen gas.

The PAOs of the preferred embodiments of the present invention can be obtained by polymerizing a $C_8$-$C_{12}$ monomer, preferably 1-decene, by itself or, optionally, by copolymerizing a $C_8$-$C_{12}$ monomer, preferably 1-decene, with one or more other olefins, preferably alpha olefins, in the presence of a catalyst composition formed by activating a metallocene procatalyst with a suitable cocatalyst. In some embodiments, the one or more other alpha olefins may include, but are not limited to, alpha-olefins containing from 3 to 20 carbon atoms, and preferably from about 6 to about 12 carbon atoms. Suitable alpha-olefins include, for example, propene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene and the like and vinyl aromatic monomers such as styrene, α-methyl styrene and the like. In a preferred embodiment, the primary monomer is 1-decene, although one or more other decenes, alone or in combination with 1-decene, may also be employed When the decene is copolymerized with another alpha olefin, the other alpha olefin is preferably propene.

When a decene is copolymerized in the presence of one or more other alpha olefins, the PAOs produced preferably comprise from about 75 wt % to about 99 wt % decene, e.g., from about 80 wt % to about 90 wt % decene, from about 85 wt % to about 95 wt % decene, or from about 90 wt % to about 99 wt % decene; and from about 1 wt % to about 25 wt % of the one or more alpha olefins, e.g., from about 10 wt % to about 20 wt % of the one or more alpha olefins, from about 5 wt % to about 15 wt % of the one or more alpha olefins, or from about 1 wt % to about 10 wt % of the one or more alpha olefins.

The catalyst composition for use herein is formed by activating a metallocene procatalyst with a suitable co-catalyst. The terms "metallocene" and "metallocene procatalyst" as used herein shall be understood to refer to compounds possessing a transition metal M, at least one non-cyclopentadienyl-derived ligand and zero or one heteroatom-containing ligand, the ligand being coordinated to M and corresponding in number to the valence thereof. Such compounds, cocatalysts useful for their activation to provide metallocene catalysts that may be employed for the polymerization of olefins to provide polyolefin homopolymers and copolymers, and/or polymerization processes employing one or more of the metallocene catalysts are described in, among others, U.S. Pat. Nos. 4,752,597; 4,892,851; 4,931,417; 4,931,517; 4,933,403; 5,001,205; 5,017,714; 5,026,798; 5,034,549; 5,036,034; 5,055,438; 5,064,802; 5,086,134; 5,087,677; 5,126,301; 5,126,303; 5,132,262; 5,132,380; 5,132,381; 5,145,819; 5,153,157; 5,155,080; 5,225,501; 5,227,478; 5,241,025; 5,243,002; 5,278,119; 5,278,265; 5,281,679; 5,296,434; 5,304,614; 5,308,817; 5,324,800; 5,328,969; 5,329,031; 5,330,948; 5,331,057; 5,349,032; 5,372,980; 5,374,753; 5,385,877; 5,391,629; 5,391,789; 5,399,636; 5,401,817; 5,406,013; 5,416,177; 5,416,178; 5,416,228; 5,427,991; 5,439,994; 5,441,920; 5,442,020; 5,449,651; 5,453,410; 5,455,365; 5,455,366; 5,459,117; 5,466,649; 5,470,811; 5,470,927; 5,477,895; 5,491,205; and, 5,491,207, the contents of which are incorporated by reference herein.

Preferred catalyst compositions used to produce the PAOs of the present invention are formed by activating a metallocene procatalyst with a suitable co-catalyst, wherein the metallocene procatalyst is one or a mixture of metallocene compounds of the formula (I):

$$(Cp^1R^1_m)R^3(Cp^2R^2_p)MX_q \quad (I)$$

wherein $Cp^1$ of ligand $(Cp^1R^1_m)$ and $Cp^2$ of ligand $(Cp^2R^2_p)$ are the same or different cyclopentadienyl rings; $R^1$ and $R^2$ each is, independently, a hydrocarbyl, halocarbyl, heterocarbyl, hydrocarbyl-substituted organometalloid or halocarbyl-substituted organometalloid group containing up to 20 carbon atoms; m is an integer from 0 to 5; p is an integer from 0 to 5; two $R^1$ and/or $R^2$ substituents on adjacent carbon atoms of the cyclopentadienyl ring associated therewith can be joined together to form a ring fused to the cyclopentadienyl ring, the fused ring containing from 4 to 20 carbon atoms; $R^3$ is a bridging group bridging $Cp^1$ and $Cp^2$; M is a transition metal having a valence of from 3 to 6; each X is a non-cyclopentadienyl ligand and is, independently, halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to 20 carbon atoms; and q is equal to the valence of M minus 2. Methods for preparing these and other useful metallocene procatalysts are known in the art.

When employing the foregoing metallocene procatalyst and the cocatalyst is entirely an aluminoxane, ligand $(Cp^1R^1_m)$ is preferably different from ligand $(Cp^2R^2_p)$, and bridging group $R^3$ preferably contains at least two bulky groups. Of these bridged metallocenes, it is preferred that a bridging group $R^3$ possess the structure:

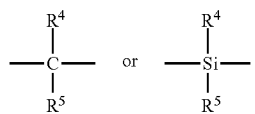

wherein in which bulky groups $R^4$ and $R^5$ each, independently, is, or contains, a cyclohydrocarbyl group containing up to 20 and preferably from 6 to 12 carbon atoms and from 0 to 3 heteroatoms such as oxygen, sulfur, tertiary nitrogen, boron or phosphorus and, in particular, is a cycloalkyl, heterocycloalkyl, cycloalkenyl, heterocycloalkenyl, aryl, heteroaryl, alkaryl, alkylheteroaryl, aralkyl, heteroarallyl, and the like. M in the compound of formula (I) is titanium, zirconium or hafnium, q is 2 and each X is halogen.

Of this preferred group of bridged metallocenes, those in which ligand $(Cp^1R^1_m)$ is substituted or unsubstituted cyclopentadienyl, ligand $(Cp^2R^2_p)$ is indenyl or fluorenyl, M is zirconium, $R^4$ and $R^5$ each is substituted or unsubstituted phenyl and each X ligand is chlorine are particularly preferred.

Exemplary bridged metallocenes of the formula (I) that can be used in the polymerization process of the embodiments of the present invention include, without limitation: diphenylmethylene (indenyl)(fluorenyl)zirconium dichloride, diphenylmethylene (cyclopentadienyl) (4,5,6,7-tetrahydro-indenyl) zirconium dichloride, diphenylmethylene (cyclopentadienyl) (2-methylindenyl) zirconium dichloride, diphenylmethylene (2,4-dimethylcyclo-pentadienyl) (3', 5' dimethylcyclopentadienyl)zirconium dichloride, diphenylmethylene(2-methyl-4-tert-butylcyclo-pentadienyl) (3'-tert-butyl-5-methylcyclopentadienyl)zirconium dichloride, dixylylmethylene (2,3,5-trimethylcyclopentadienyl) (2', 4,5'-trimethylcyclopentadienyl)zirconium dichloride, dixylylmethylene (2,4-dimethylcyclopentadienyl) (3',5'-dimethylcyclopentadienyl)zirconium dichloride, dixylylmethylene (2-methyl-4-tert-butylcyclopentadienyl) (3'-tert-butyl-5-methylcyclopentadienyl)zirconium dichloride, dixylylmethylene (cyclopentadienyl)(fluorenyl)zirconium dichloride, di-o-tolylmethylene (cyclopentadienyl) (3,4-dimethyl-cyclopentadienyl)zirconium dichloride, di-o-tolylmethylene (cyclopentadienyl) (3,4-dimethyl-cyclopentadienyl)zirconium dichloride, di-o-tolylmethylene (cyclopentadienyl) (3,4-dimethylcyclopentadienyl)zirconium dichloride, di-o-tolylmethylene (cyclopentadienyl)(indenyl)zirconium dichloride, dibenzylmethylene (cyclopentadienyl)(tetramethylcyclopentadienyl)zirconium dichloride, dibenzylmethylene (cyclopentadienyl)(indenyl)zirconium dichloride, dibenzylmethylene (cyclopentadienyl) (fluorenyl)zirconium dichloride, dicyclohexylmethylene (cyclopentadienyl)(indenyl) zirconium dichloride, dicyclohexyl(cyclopentadienyl) (fluorenyl)zirconium dichloride, dicyclohexylmethylene (2-methylcyclopentadienyl) (fluorenyl)zirconium dichloride, diphenylsilyl (2,4-dimethylcyclopentadienyl)(3',5-dimethylcyclopentadienyl)zirconium dichloride, diphenylsilyl (2,4-dimethylcyclopentadienyl) (3', 5'-dimethylcyclopentadienyl) zirconium dichloride, diphenylsilyl (2,3,5-trimethylcyclopentadienyl) (2,4,trimethylcyclopentadienyl)zirconium dichloride, tetraphenyldisilyl (cyclopentadienyl)(indenyl)zirconium dichloride, tetraphenyldisilyl (3-methylcyclopentadienyl)(indenyl) zirconium dichloride, tetraphenyldisilyl(cyclopentadienyl) (fluorenyl)zirconium dichloride, di-o-tolylsilyl(cyclopentadienyl) (trimethylcyclopentadienyl)zirconium dichloride, di-o-tolylsilyl (cyclopentadienyl)(tetramethylcyclopentadienyl)zirconium dichloride, di-o-tolylsilyl (cyclopentadienyl) (3,4-diethylcyclopentadienyl)zirconium dichloride, di-o-tolylsilyl (cyclopentadienyl) (triethylcyclopentadienyl) zirconium dichloride, dibenzylsilyl (cyclopentadienyl) (fluorenyl)zirconium dichloride, dibenzylsilyl(cyclopentadienyl) (2,7-di-t-butyl-fluorenyl)zirconium dichloride, and dicyclohexylsilyl(cyclopentadienyl) (fluorenyl) zirconium dichloride.

The cocatalyst, or activator, employed with the metallocene procatalysts of formula (I) can be any of the aluminoxanes known to activate metallocene procatalysts. Exemplary aluminoxane cocatalysts include alkylaluminoxanes such as methylaluminoxane (MAO) or triisobutylaluminoxane (TIBAO). See, e.g., U.S. Pat. No. 5,229,478, the entirety of which is incorporated by reference as if fully set forth herein.

In general, the bridged metallocene procatalyst can be present in the reactor in an amount, expressed in terms of its transition metal content, of from about 0.0001 mmol/L to about 0.05 mmol/L, preferably from about 0.0002 mmol/L to about 0.025 mmol/L and more preferably from about 0.00025 mmol/L to about 0.01 mmol/L.

Corresponding to these amounts of transition metal, the aluminoxane cocatalyst can be utilized in an amount of from about 0.01 mmol/L to about 12.5 mmol/L, preferably from about 0.02 mmol/L to about 3.5 mmol/L and more preferably from about 0.025 mmol/L to about 1.0 mmol/L. The optimum levels of bridged metallocene procatalyst and aluminoxane cocatalyst will, to some extent, depend upon the specific procatalyst and cocatalyst selected as well as other polymerization process variables.

In terms of ranges, the molar ratios of aluminoxane cocatalyst to metallocene procatalyst can be less than about 500:1, less than about 400:1, less than about 300:1, less than about 200:1, less than about 100:1, less than about 50:1, or less than about 25:1. In some embodiments, the molar ratio of aluminoxane cocatalyst to metallocene procatalyst is preferably less than about 250:1, e.g., less than about 100:1, or less than about 25:1.

When employing an aluminoxane cocatalyst, it can be advantageous to include a trialkylaluminum compound such as trimethylaluminum, triethylaluminum, tri(n-propyl) aluminum, triisopropyaluminum, tri(n-butyl) aluminum, triisobutylaluminum, and the like, to reduce the amount of aluminoxane required for suitable activation of the metallocene procatalyst. In general, the optional trialkylaluminum can be utilized in a molar ratio to metallocene procatalyst of from about 1 to about 1000 and preferably from about 2 to about 500.

According to the invention, an activator, e.g., a neutral or anionic metalloid-containing component, is employed with the aluminoxane cocatalyst and activates the metallocene procatalyst. In preferred embodiments, the neutral or anionic metalloid-containing component is an organoboron compound, i.e., an organoborane or an organoborate.

Exemplary neutral metalloid-containing components include boranes such as perfluoroarylborane compounds, e.g., tris(pentafluorophenyl)borane, tris(methoxyphenyl)borane, tris(trifluoromethylphenyl)borane, tris(3,5-di[trifluoro-methyl]phenyl)borane, tris(tetrafluoroxylyl)borane, tris(tetrafluoro-o-tolyl)borane, and the like. Of the foregoing boranes, tris(pentafluorophenyl) borane and tris(3,5-di[trifluoromethyl]phenyl)borane are preferred. Useful second components include aluminum homologs of the foregoing compounds.

Exemplary anionic metalloid-containing components include borates such as perfluoroaryl borates, e.g., lithium tetrakis(pentafluorophenyl)borate, lithiumtetrakis (trifluoromethylphenyl)borate, lithium tetrakis(3,5-di[tri-fluoromethyl]phenyl)borate, sodium tetrakis(pentafluoro-phenyl)borate, potassium tetrakis(pentafluorophenyl)borate, magnesium tetrakis(pentafluorophenyl)borate, titanium tetrakis(pentafluorophenyl)borate, tin tetrakis(pentafluorophenyl)borate, dimethylanilinium tetrakis(pentafluorophenyl) borate and the like. Of the foregoing borates, dimethylaniliniumtetrakis(pentafluorophenyl)borate and alkali metal borates such as lithium tetrakis(pentafluorophenyl)borate and lithium tetrakis(3,5-di[trifluoro-methyl]phenyl)borate are preferred. In some embodiments, aluminate homologs of the foregoing compounds may be used.

In general, neutral or anionic metalloid-containing components, e.g., organoboron compounds, can be utilized in a molar ratio to metallocene procatalyst of about 1:2, about 1:1.5, about 1:1, or about 1:0.5. In terms of ranges, the molar ratio of the neutral or anionic metalloid-containing component, e.g., organoboron compound, to metallocene optionally is from 0.3:1 to 4:1, e.g., from 0.6:1 to 2:1. When the anionic metalloid-containing component is dimethylaniliniumtetrakis(pentafluorophenyl)borate, the ratio of the boron compound to the metallocene procatalyst is 1:1. When a neutral or anionic metalloid-containing component is utilized, e.g., an organoboron compound, the ratio of the aluminoxane cocatalyst to the combination of metallocene procatalyst and the organoboron compound can be less than about 125:1, less than about 50:1, less than about 25:1, or less than about 12.5:1.

Activation of the metallocene to yield an activated metallocene catalyst composition can be achieved by combining the aforementioned metallocene procatalysts with the aluminoxane cocatalyst, and in the presence of a neutral or anionic metalloid-containing activator, either simultaneously or in any sequence and with any interval of time therebetween and either in the presence of, or in the absence of, the olefin monomer(s) and hydrogen.

In some embodiments, the activated metallocene catalyst compositions is prepared in advance and thereafter the composition is introduced into the polymerization reactor with the olefin monomer (s), optionally in the presence of hydrogen.

The reaction of the metallocene procatalyst with the aluminoxane cocatalyst, preferably in the presence of an activator, to generate an activated metallocene catalyst may be conducted at a temperature ranging from about 0 to about 100° C., e.g., from about 0 to about 80° C., from about 10 to about 50° C., or from about 25 to about 50° C. for a time period of from about 1 minute to about 72 hours, e.g., from about 1 minute to about 50 hours, from about 1 minute to about 30 hours, or from about 1 minute to about 24 hours.

Polymerization or copolymerization of the aforementioned monomers, optionally in the presence of hydrogen, using activated metallocene catalyst can be carried out in any known manner, e.g., in the liquid phase (i.e., in a solution or slurry process) or in a suspension process, either continuously or in batch. These processes are generally carried out at temperatures in the range of from about 0° C. to about 200° C., e.g., from about 0° C. to about 150° C., from about 10° C. to about 100° C., or from about 50° C. to about 150° C. When the polymerization or copolymerization is carried out in the presence of hydrogen, exemplary pressures of hydrogen used include from about 10 psig (69 kPag) to about 3000 psig (20700 kPag), e.g., from about 10 psig (69 kPag) to about 500 psig (3450 kPag), from about 10 psig (69 kPag) to about 200 psig (1380 kPag), from about 50 psig (345 kPag) to about 150 psig (1034 kPag), or from about 10 (69 kPag) to about 60 psig (414 kPag).

It should be recognized that control of the polymerization temperature has a direct bearing on the quality of the polymerization, e.g., activity, as well as the final product properties including the level of unsaturation in the polymer as evidenced by the iodine number. Generally, as the polymerization temperature approaches 150° C. or greater, the maximum temperature reached during the polymerization, even in situations where there is an exotherm, should be substantially close to the initial polymerization temperature. In some instances, however, care should be taken at polymerization temperatures exceeding 150° C. such that the polymerization temperature, even in situations where there is an exotherm, is not more than about 20° C. greater than the initial polymerization temperature.

Due to the nature of the final polyolefin, the polymerization can be carried out in neat liquid monomer (i.e., in the absence of solvent) or, if desired, in the presence of solvent. Dilution solvents that can be employed include straight and branched chain hydrocarbons such as butanes, pentanes, hexanes, heptanes, octanes, and the like, cyclic and alicyclic hydrocarbons such as cyclopentane, cyclohexane, cycloheptane, methylcyclopentane, methylcyclohexane, methylcycloheptane, and the like, and alkyl-substituted aromatic compounds such as toluene, xylene, and the like, and mixtures thereof.

A typical batch solution polymerization process can be carried out by first introducing the liquid $C_8$-$C_{12}$ monomer, e.g., 1-decene, either alone or in combination with an optional hydrocarbon solvent, e.g., hexane, xylenes, etc., into a stirred tank reactor. If copolymerization is carried out in the presence of an additional liquid monomer, e.g., 1-octene, it can be added either sequentially or simultaneously with the other monomer. If copolymerization is carried in the presence of a gaseous monomer, e.g., propene, the gaseous monomer may be sparged either into a solution of the other monomer (gaseous or liquid) or into a neat liquid monomer. Typical pressures of gaseous monomer are from about 10 to about 100 psig (690 kPag), e.g., from about 10 psig (69 kPag) to about 80 psig (552 kPag), from about 10 psig (69 kPag) to about 60 psig (414 kPag), or from about 10 psig (69 kPag) to about 50 psig (345 kPag).

A minor amount of an inert impurity scavenger, e.g., the aforementioned trialkylaluminum compounds, can optionally be added. The reactor is then heated or cooled to the desired temperature and a measured amount of hydrogen can optionally and separately be introduced into the stirred tank reactor. By carrying out the polymerization reaction in the presence of hydrogen, a hydrogenation step is eliminated and the liquid polyalphaolefins of some embodiments of the present invention are substantially saturated and, therefore, will possess a low iodine value, e.g., an iodine number of from about 0.0 to about 10, preferably from about 0.1 to about 5, and most preferably from about 0.2 to about 3.

Once the desired conditions are established, a hydrocarbon solution of the catalyst in the required amounts is then added to the liquid phase in the reactor. The rate of polymerization is controlled by the concentration of the catalyst and monomer (s) present or added during polymerization. The reactor temperature is controlled by means of cooling coils, etc., and the initial total pressure in the reactor is maintained by a constant flow of hydrogen, inert gas, gaseous monomer(s) or a combination thereof. After polymerization is complete, the reactor is depressurized and the catalyst is deactivated by conventional means. Spent catalyst components can be isolated from the reaction product via mixing with, e.g., alcohol, water, or a mixture of both, then by phase separation of the hydrocarbyl component from the aqueous component. Alternatively, a basic or acid solid such as calcium oxide or acid clay may be mixed with the reaction product and filtered. The liquid polyolefin can then be recovered from the hydrocarbyl component by conventional methods, e.g., evaporation, distillation, etc., and then further processed as desired.

Depending on the amount of monomer conversion and viscosity of the reactor contents, a hydrocarbon solvent can be added to aid in removal of the product liquid polyolefin. Spent catalyst components can be isolated from the reaction product via mixing with, e.g., alcohol, water or a mixture of both, then by phase separation of the hydrocarbyl component from the aqueous component. The liquid polyolefin can then be recovered from the hydrocarbyl component by conventional methods, e.g., evaporation, distillation, etc., and then further processed as desired.

The present invention will now be further described with reference to the following non-limiting Examples.

Example 1

Comparative

In a glove box, 0.02 grams of diphenylmethylene(cyclopentadienyl)(9-fluorenyl) zirconium dichloride (hereinafter $Ph_2C(Cp$-9-$Flu)ZrCl_2$) was weighed out into a 25 ml vial. 12 ml of 1.5M MAO solution was added and the mixture dissolved using a shaker for at least 10 minutes at room temperature.

A moisture and air free 3 liter Buchi reactor was charged with 670 grams of dry 1-decene monomer. The reactor was purged with nitrogen. The reactor was brought to a temperature of 90° C. The reactor was vented to near zero pressure. Hydrogen was added to bring the reactor pressure to 50 psig (345 kPag). Using a dry 5 ml syringe and needle, 5 ml of catalyst solution was added to the reactor. With 550 rpm of agitation, the reaction was allowed to proceed for 30 minutes. The reactor was vented and purged with nitrogen and the product allowed to cool to a safe temperature for removal.

The reactor contents were then transferred to a vessel equipped with an agitator and 13.4 grams of powdered calcium oxide was added, heated to 120° C. and the solution mixed for 30 minutes, and then filtered. The polymer was obtained from the remaining organic solution by evaporation under reduced pressure in a rotary evaporator. 609.7 grams of polyolefin material was obtained with a kinematic viscosity at 100° C. of 399 cSt.

Examples 2-6

Examples 2-6 were performed in the same manner as Example 1 except that borate was added on an equal molar basis (0.0288 grams of dimethylaniliniumtetrakis (pentafluorophenyl)borate) to the $Ph_2C(Cp$-9-$Flu)ZrCl_2$, and the MAO (reduced as described in Table 1 with toluene being substituted for the balance).

TABLE 1

|  | RUN# | | | | | |
| --- | --- | --- | --- | --- | --- | --- |
|  | 1 | 2 | 3 | 4 | 5 | 6 |
| Description | PAO | PAO | PAO | PAO | PAO | PAO |
| Polymerization Temperature: (° C.) | 90 | 90 | 90 | 90 | 90 | 90 |
| Polymerization Time: (Minutes) | 30 | 30 | 30 | 30 | 30 | 30 |
| Co-Catalyst Type | MAO | MAO | MAO | MAO | MAO | MAO |
| Weight %: 10% (1.5M) mL [cocatalyst amount] | 12 [1.05 gr] | 6 [0.52 gr] | 3 [0.26 gr] | 2.4 [0.21 gr] | 1.2 [0.105 gr] | 0.6 [0.0525 gr] |

TABLE 1-continued

| | RUN# | | | | | |
|---|---|---|---|---|---|---|
| | 1 | 2 | 3 | 4 | 5 | 6 |
| $H_2$ 100% psig (kPag) | 50 (345) | 50 (345) | 50 (345) | 50 (345) | 50 (345) | 50 (345) |
| Catalyst Activator Type: | none | Borate | Borate | Borate | Borate | Borate |
| Activator: (grams) | 0 | 0.0288 | 0.0288 | 0.0288 | 0.0288 | 0.0288 |
| Agitator Speed, rpm | 550 | 550 | 550 | 550 | 550 | 550 |
| Decene, grams | 670 | 670 | 670 | 670 | 670 | 670 |
| Co-Catalyst:Catalyst Ratio, MAO:Zr | 500:1 | 250:1 | 125:1 | 100:1 | 50:1 | 25:1 |
| Activator:Catalyst Ratio, Borate:Zr | 0:1 | 1:1 | 1:1 | 1:1 | 1:1 | 1:1 |
| Catalyst Concentration (M) | 0.0030 | 0.0030 | 0.0030 | 0.0030 | 0.0030 | 0.0030 |
| Catalyst Volume (mL) | 5 | 5 | 5 | 5 | 5 | 5 |
| Catalyst Added, grams | 0.0083 | 0.0083 | 0.0083 | 0.0083 | 0.0083 | 0.0083 |
| Kinematic Viscosity, cSt | 399 | 522 | 514 | 490 | 456 | 370 |

The data in Table 1 generally demonstrates that as the ratio of aluminoxane to metallocene is decreased from 250:1 to 25:1, with the inclusion of a borate activator, a marked decrease in the kinematic viscosity of the resulting PAO was observed. It should be mentioned that, although a PAO with good kinematic viscosity is obtained with a ratio of aluminoxane to metallocene of 500:1, one of the advantages of the processes of the preferred embodiments of the present invention is that equivalent or even lower kinematic viscosities can be obtained while reducing the amount of the costly aluminoxane that is used to produced PAOs when the ratio of aluminoxane to metallocene is less than 100:1, e.g., 25:1.

The data from Table 1 is summarized graphically in FIG. 1, which shows a correlation between the molar ratio of (i) the aluminoxane to the metallocene, and (ii) the kinematic viscosity of the polyalphaolefin produced. Such a correlation can be used to determine a target molar ratio of the aluminoxane to, e.g., the metallocene that will yield a desired kinematic viscosity of the polyolefin produced.

Examples A-C

Comparative

A dried 3 liter Buchi reactor was filled under argon with 750 ml of dry 1-decene monomer. To this, 1.15 ml of a 25% by wt. solution of triisobutylaluminum in hexane was added to scavenge moisture and impurities, and the reactor temperature was brought up to 70° C. Once the temperature reached 70° C., 1 mole of hydrogen gas was added to the reactor via pressure drop from a vessel of known volume. Then, a solution of 0.007 g of $Ph_2C(Cp-9-Flu)ZrCl_2$ was dissolved in a 10 wt. % solution of MAO in toluene to obtain MAO to catalyst ratios of 250:1 to 1000:1 with 0.44 mmole of triisobutylaluminum. The catalyst solution was prepared 30 minutes prior to its use, and was injected into the stirring reactor under 200 psig (1379 kPag) argon pressure. The reactor was maintained at a temperature of 70° C. and 200 psig (1379 kPag) for a period of 30 minutes.

When complete, the reactor was depressurized and 400 ml hexane was added to the polymerized decene solution to aid in transfer. The reactor contents were then pressure transferred to a vessel equipped with an agitator containing 100 ml of acidified isopropanol, and agitated for 2 minutes. A white flocculent material presumed to be an aluminum alkoxide precipitated and settled in the aqueous phase. One liter of deionized water was then added to the washed mixture, stirred, allowed to settle, and the organic layer was removed from the aluminum residue-laden aqueous layer.

The polymer was obtained from the remaining organic solution by evaporation under reduced pressure in a rotary evaporator.

TABLE 2

| | Comparative Example | | |
|---|---|---|---|
| | A | B | C |
| Description | PAO | PAO | PAO |
| Polymerization Temperature: (° C.) | 70 | 70 | 70 |
| Polymerization Time: (Minutes) | 30 | 30 | 30 |
| Catalyst Activator Type: | none | None | none |
| Co-Catalyst: Catalyst Ratio, MAO:Zr | 1018:1 | 509:1 | 254:1 |
| Kinematic Viscosity, cSt | 982 | 1132 | 1308 |

The data in Table 2 demonstrates that reducing the ratio of aluminoxane to metallocene without the benefit of the borate activator caused a significant increase in the kinematic viscosity of the produced PAO.

Figure 2:
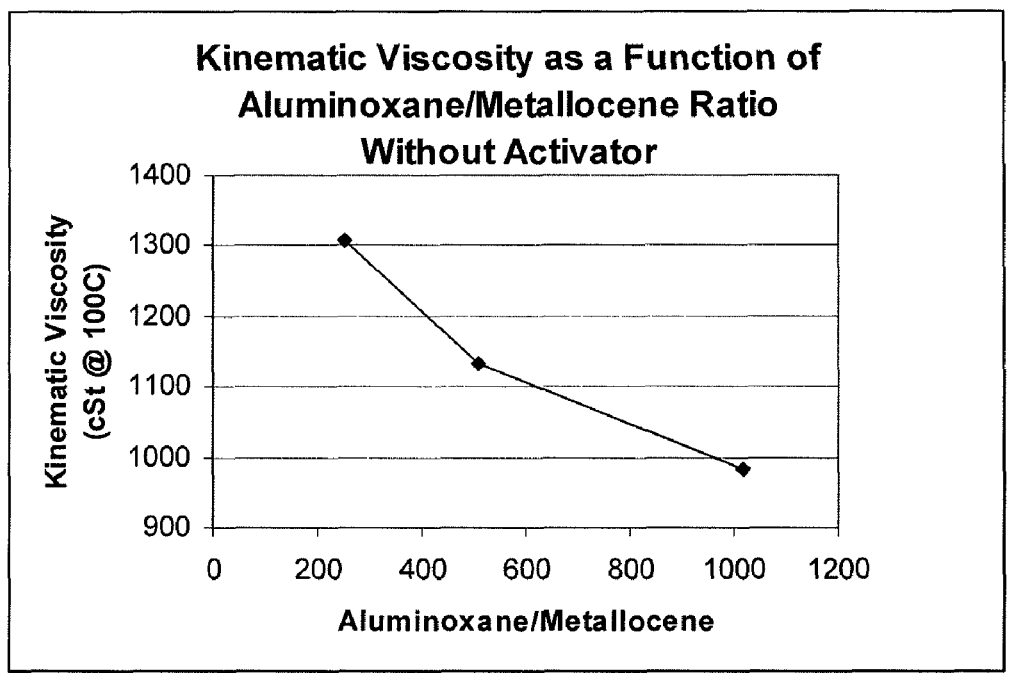
FIG. 2 is a plot of (i) the molar ratio of an aluminoxane to a metallocene, and (ii) the kinematic viscosity of a polyalphaolefin produced according to a comparative process.

The data from Table 2 is summarized graphically in FIG. 2. FIG. 2 shows a correlation between the molar ratio of (i) the aluminoxane to the metallocene, and (ii) the kinematic viscosity of the polyalphaolefin produced without the activator. This correlation shows the difficulty of making polymers with the good viscometric properties desired at low MAO levels.

Examples 7-9

A two liter stainless-steel oil-heated autoclave reactor was equipped with an agitator, 1-decene delivery system (pressurized flow and mass flow control), catalyst and hydrogen delivery system (pressurized flow and mass flow control with sub-surface hydrogen sparge) capable of achieving 300 prig (2068 kPa) pressure and 150° C. and overflowing at 1 liter liquid volume. The system was equipped with a closed loop temperature, pressure and flow control (on hydrogen, decene, and catalyst). Product was collected in a product tank for subsequent catalyst deactivation and analysis.

The catalyst solution was pre-made as follows. In a glove box free of oxygen, $Ph_2C(Cp-9-Flu)ZrCl_2$ catalyst, dimethylanilinium tetrakis(pentafluorophenyl)borate, dry toluene and 10% methylaluminoxane (MAO) in toluene was added to a clean 1 liter bottle equipped with dip-tube cap. The resulting mixture was mixed for 30 minutes. The bottle was sealed with the dip tube cap.

A reactor containing 1 liter residual crude polydecene was heated to 115° C. and pressurized with hydrogen to 240 psig (1655 kPag). The catalyst solution bottle was connected to a high pressure liquid chromatography (HPLC) piston pump which was used to feed the catalyst to the reactor. A 10 liter decene feed tank was filled with dry 1-decene, treated by pumping through a packed column containing 3 Å molecular sieves and alumina. The reaction began (time=0) by simultaneously starting the catalyst feed pump feeding, the 1-decene flow controller and the hydrogen flow controller. After 2.0 hours, the reactor reached steady state and a sample was taken. A portion of the sample was treated with water to deactivate the catalyst and the resulting white flocculent was removed by filtration. The polymer was obtained from the remaining solution by evaporation under reduced pressure. The viscosity of the sample was determined by ASTM D445. The solids content was determined by weighing 2 grams of sample into a 2 inch diameter aluminum weighing dish and heating the sample for 20 minutes on a hot plate at ~200° C. The final weight divided by the starting weight is the % Solids. Table 3 summarizes three polymers made at different MAO:metallocene ratios and at a 1:1 borate activator to catalyst molar ratio.

TABLE 3

|  | Example | | |
|---|---|---|---|
|  | 7 | 8 | 9 |
| Description | PAO | PAO | PAO |
| Polymerization Temperature: (° C.) | 115 | 115 | 115 |
| Polymerization Time: (Minutes) | 30 | 30 | 30 |
| Catalyst Concentration (M), mmoles/L monomer | 0.0223 | 0.0229 | 0.0226 |
| Co-Catalyst:Catalyst Ratio, MAO:M | 358:1 | 239:1 | 116:1 |
| Activator:Catalyst Ratio, mole:mole | 1.01:1 | 0.96:1 | 1.04:1 |
| Kinematic Viscosity, cSt | 114.7 | 114.5 | 119.7 |
| % Solids | 77.1 | 79.2 | 88.25 |

The data from Table 3 shows the ability of making PAO with good viscometric properties at reduced MAO levels when a borate activator is used. Also, it is evident that by decreasing MAO levels with the use of a borate activator you get higher yields, as indicated by the % Solids.

Figure 3:
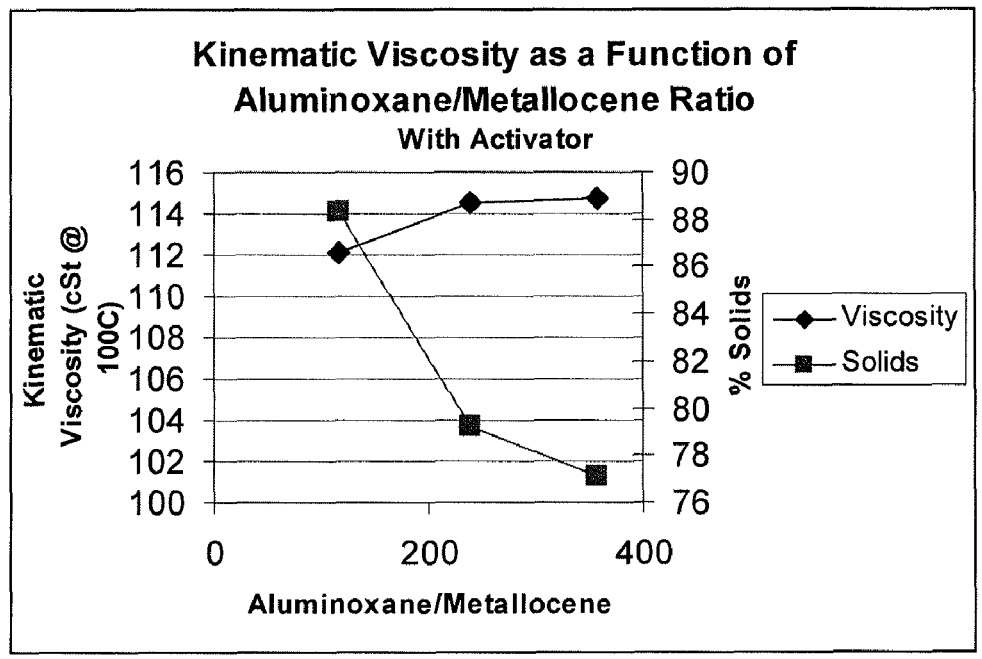
FIG. 3 is a plot of (i) the molar ratio of an aluminoxane to a metallocene, (ii) the kinematic viscosity, and (iii) the solids of a polyalphaolefin produced according to the processes of the preferred embodiments of the present invention using a continuous process.

The data from Table 3 is summarized graphically in FIG. 3. FIG. 3 shows how kinematic viscosity stays relatively stable at varying MAO:metallocene molar ratios while the amount of polymer produced (% solids) increases as the MAO:metallocene molar ratio is decreased indicating improved product yields with lower levels of cocatalyst.

Examples D-F

Comparative

The sample procedure used in Examples 7-9 were used with the exception that no activator was used. Table 4 summarizes three polymers made at different MAO:metallocene molar ratios without the benefit of the borate activator.

TABLE 4

|  | Comparative Example | | |
|---|---|---|---|
|  | D | E | F |
| Description | PAO | PAO | PAO |
| Polymerization Temperature: (° C.) | 115 | 115 | 115 |
| Polymerization Time: (Minutes) | 30 | 30 | 30 |
| Catalyst Concentration (M), mmoles/L monomer | 0.0225 | 0.0229 | 0.0209 |
| Co-Catalyst:Catalyst Ratio, MAO:Zr | 349:1 | 233:1 | 120:1 |

TABLE 4-continued

|  | Comparative Example | | |
|---|---|---|---|
|  | D | E | F |
| Kinematic Viscosity, cSt | 116.9 | 130.0 | 185.0 |
| % Solids | 76.4 | 75.4 | 75.0 |

The data in Table 4 shows that decrease the MAO levels without the benefit of the borate activator leads to higher viscosity PAO while marginally reducing the product yield.

Figure 4:
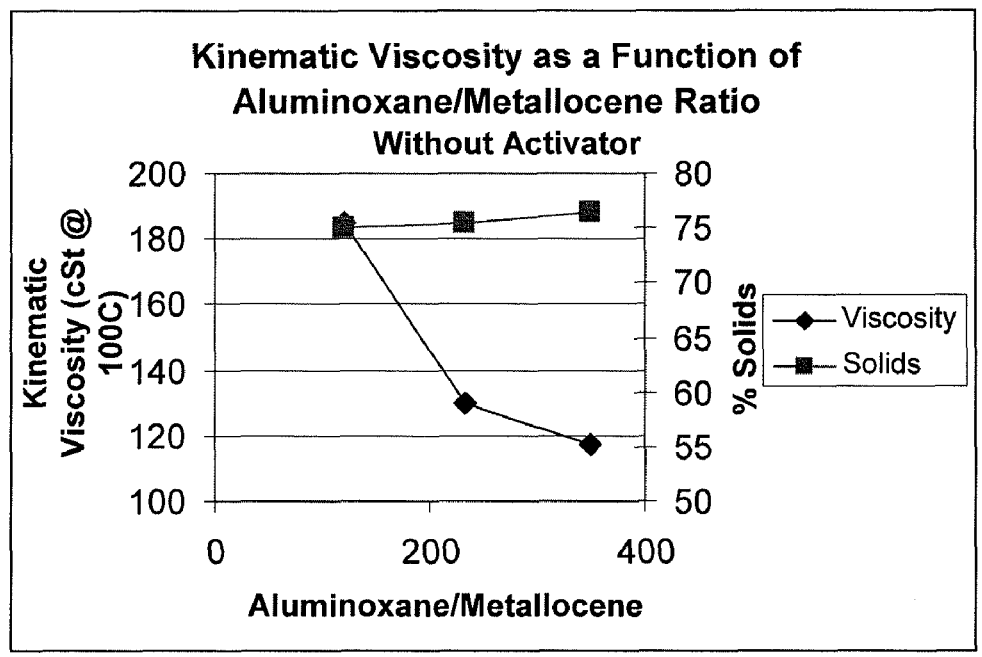
FIG. 4 is a plot of (i) the molar ratio of an aluminoxane to a metallocene, (ii) the kinematic viscosity, and (iii) the solids of a polyalphaolefin produced according to a comparative process using a continuous process.

The data from Table 4 is summarized graphically in FIG. 4. FIG. 4 shows how kinematic viscosity increases substantially when MAO:metallocene ratio is decreased while the amount of polymer produced (% solids) decreases marginally, not allowing good viscometrics or improved polymer yields seen with the activator.

Any feature described or claimed with respect to any disclosed implementation may be combined in any combination with any one or more other feature(s) described or claimed with respect to any other disclosed implementation or implementations, to the extent that the features are not necessarily technically incompatible, and all such combinations are within the scope of the present invention. Furthermore, the claims appended below set forth some non-limiting combinations of features within the scope of the invention, but also contemplated as being within the scope of the invention are all possible combinations of the subject matter of any two or more of the claims, in any possible combination, provided that the combination is not necessarily technically incompatible. All patents, patent applications and publications cited herein are incorporated by reference in their entirety.

What is claimed is:

1. A process for forming a polyalphaolefin, the process comprising the step of polymerizing at least one $C_8$-$C_{12}$ monomer in the presence of an aluminoxane, an activator and a metallocene to form the polyalphaolefin, wherein the molar ratio of the aluminoxane to the metallocene is less than 250:1.

2. The process of claim 1, wherein the monomer is 1-decene.

3. The process of claim 1, wherein the molar ratio of the aluminoxane to the metallocene is less than 100:1.

4. The process of claim 1, wherein the molar ratio of the aluminoxane to the metallocene is less than 25:1.

5. The process of claim 1, wherein the activator comprises an organoboron compound, and the molar ratio of the organoboron compound to the metallocene is from 1:0.5 to 1:1.5.

6. The process of claim 1, wherein the polyalphaolefin has a kinematic viscosity less than 500 centiStokes.

7. The process of claim 1, wherein the polyalphaolefin has a kinematic viscosity less than 400 centiStokes.

8. The process of claim 1, wherein the polyalphaolefin has a kinematic viscosity less than 300 centiStokes.

9. The process of claim 1, wherein the metallocene is a compound of the formula:

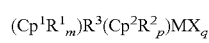

$(Cp^1R^1{}_m)R^3(Cp^2R^2{}_p)MX_q$ wherein $Cp^1$ of ligand $(Cp^1R^1{}_m)$ and $Cp^2$ of ligand $(Cp^2R^2{}_p)$ are the same or different cyclopendadienyl rings;

$R^1$ and $R^2$ each is, independently, a hydrocarbyl, halocarbyl, heterocarbyl, hydrocarbyl-substituted organometalloid or halocarbyl substituted organometalloid group containing up to 20 carbon atoms;

m is an integer from 0 to 5;

p is an integer from 0 to 5;

two $R^1$ and/or $R^2$ substituents on adjacent carbon atoms of the cyclopentadienyl ring associated therewith can be joined together to form a ring fused to the cyclopentadienyl ring, the fused ring containing from 4 to 20 carbon atoms;

$R^3$ is a bridging group bridging $Cp^1$ and $Cp^2$;

M is a transition metal having a valence of from 3 to 6;

each X is a non-cyclopentadienyl ligand and is, independently, halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to 20 carbon atoms; and q is equal to the valence of M minus 2.

10. The process of claim 1, wherein the metallocene catalyst is a catalyst selected from the group consisting of diphenylmethylene(indenyl)(fluorenyl)zirconium dichloride; diphenylmethylene(cyclopentadienyl-9-fluorenyl)zirconium dichloride; diphenylmethylene(3-methyl-cyclopentadienyl-9-fluorenyl)zirconium dichloride; diphenylmethylene(3-ethyl-cyclopentadienyl-9-fluorenyl)zirconium dichloride; diphenylmethylene(3-propyl-cyclopentadienyl-9-fluorenyl)zirconium dichloride; diphenylmethylene(3-butyl-cyclopentadienyl-9-fluorenyl)zirconium dichloride; diphenylmethylene(cyclopentadienyl-indenyl)zirconium dichloride; diphenylmethylene(cyclopentadienyl)(4,5,6,7-tetrahydroindenyl)zirconium dichloride; diphenylmethylene(cyclopentadienyl)(2-methylindenyl)zirconium dichloride; diphenylmethylene(cyclopentadienyl)(2-phenylindenyl)zirconium dichloride; diphenylmethylene(2,4-dimethylcyclo-pentadienyl)(3',5'-dimethylcyclopentadienyl)zirconium dichloride; diphenylmethylene(2-methyl-4-tert-butylcyclo-pentadienyl)(3'-tert-butyl-5'-methylcyclopentadienyl)zirconium dichloride; dixylylmethylene(2,3,5-trimethylcyclopentadienyl)(2',4',5'-trimethylcyclopentadienyl)zirconium dichloride; dixylylmethylene(2,4-dimethylcyclopentadienyl)(3',5'-dimethylcyclopentadienyl)zirconium dichloride; dixylylmethylene(2-methyl-4-tert-butylcyclopentadienyl)(3'-tert-butyl-5-methylcyclopentadienyl)zirconium dichloride; dixylylmethylene(cyclopentadienyl)(fluorenyl)zirconium dichloride; di-o-tolylmethylene(cyclopentadienyl)(3,4-dimethyl-cyclopentadienyl)zirconium dichloride; di-o-tolylmethylene(cyclopentadienyl)(3,4-dimethyl-cyclopentadienyl)zirconium dichloride; di-o-tolylmethylene(cyclopentadienyl)(3,4-dimethylcyclopentadienyl)zirconium dichloride; di-o-tolylmethylene(cyclopentadienyl)(indenyl)zirconium dichloride; dibenzylmethylene(cyclopentadienyl)(tetramethylcyclopentadienyl)zirconium dichloride; dibenzylmethylene(cyclopentadienyl)(indenyl)zirconium dichloride; dibenzylmethylene(cyclopentadienyl)(fluorenyl)zirconium dichloride; dicyclohexylmethylene(cyclopentadienyl)(indenyl)zirconium dichloride; dicyclohexyl(cyclopentadienyl)(fluorenyl)zirconium dichloride; dicyclohexylmethylene(2-methylcyclopentadienyl)(fluorenyl)zirconium dichloride; diphenylsilyl(2,4-dimethylcyclopentadienyl)(3',5'-dimethylcyclopentadienyl)zirconium dichloride; diphenylsilyl(2,4-dimethylcyclopentadienyl)(3',5'-dimethyl-cyclopentadienyl)zirconium dichloride; diphenylsilyl(2,3,5-trimethylcyclopentadienyl)(2,4,5-trimethylcyclopentadienyl)zirconium dichloride; tetraphenyldisilyl(cyclopentadienyl)(indenyl)zirconium dichloride; tetraphenyldisilyl(3-methylcyclopentadienyl)(indenyl)zirconium dichloride; tetraphenyldisilyl(cyclopentadienyl)(fluorenyl)zirconium dichloride; di-o-tolylsilyl(cyclopentadienyl)(trimethylcyclopentadienyl)zirconium dichloride; di-o-tolylsilyl(cyclopentadienyl)(tetramethylcyclopentadienyl)zirconium dichloride; di-o-tolyisilyl(cyclopentadienyl)(3,4-diethylcyclopentadienyl)zirconium dichloride; di-o-tolylsilyl(cyclopentadienyl)(triethylcyclopentadienyl)zirconium dichloride; dibenzylsilyl(cyclopentadienyl)(fluorenyl)zirconium dichloride; dibenzylsilyl(cyclopentadienyl)(2,7-di-t-butyl-fluorenyl)zirconium dichloride; and dicyclohexylsilyl(cyclopentadienyl)(fluorenyl)zirconium dichloride.

11. The process of claim 1, wherein the aluminoxane is methylaluminoxane.

12. The process of claim 1, wherein the activator comprises an organoboron compound selected from the group consisting of lithium tetrakis(pentafluorophenyl)borate, lithium tetrakis(trifluoromethylphenyl)borate, lithium tetrakis(3,5-di(tri-fluoromethyl)phenyl)borate, sodium tetrakis(pentafluoro-phenyl)borate, potassium tetrakis(pentafluorophenyl)borate, magnesium tetrakis(pentafluorophenyl)borate, titanium tetrakis(pentafluorophenyl)borate, tin tetrakis(pentafluorophenyl)borate, and dimethylanilinium tetrakis(pentafluorophenyl)borate.

13. The process of claim 1, wherein the at least one monomer further comprises propene.

14. A process for forming a polyalphaolefin, the process comprising the step of polymerizing at least one $C_8$-$C_{12}$ monomer in the presence of an aluminoxane, an organoboron compound, and a metallocene to form the polyalphaolefin, wherein the molar ratio of the aluminoxane to the combination of the organoboron compound and the metallocene is less than 125:1.

15. The process of claim 14, wherein the molar ratio of the aluminoxane to the combination of the organoboron compound and the metallocene is less than 50:1.

16. The process of claim 14, wherein the molar ratio of the aluminoxane to the combination of the organoboron compound and the metallocene is less than 25:1.

17. The process of claim 14, wherein the molar ratio of the aluminoxane to the combination of the organoboron compound and the metallocene is less than 12.5:1.

18. A process for forming a polyalphaolefin having a desired kinematic viscosity of less than 500 cSt at 100° C. using ASTM D-445 from at least one $C_8$-$C_{12}$ monomer in the presence of an aluminoxane, a metallocene, and an organoboron compound, the process comprising the steps of:

(a) providing a correlation between (i) the molar ratio of the aluminoxane to the metallocene, and (ii) the kinematic viscosity of the polyalphaolefin;

(b) determining, from the correlation, a target molar ratio of the aluminoxane to the metallocene that will yield a desired kinematic viscosity of the polyolefin;

(c) forming a reaction mixture comprising the at least one monomer, the aluminoxane, the metallocene and optionally the organoboron compound, wherein the relative ratio of the aluminoxane to the metallocene in the reaction mixture corresponds to the target molar ratio; and (d) polymerizing the at least one monomer in the reaction mixture to form the polyalphaolefin having the desired kinematic viscosity.

19. The process of claim 18, wherein the target molar ratio is less than 250:1.

20. The process of claim 18, wherein the target molar ratio is less than 100:1.

21. The process of claim 18, wherein the target molar ratio is less than 25:1.

22. The process of claim 18, wherein the target molar ratio of the aluminoxane to the organoboron compound is less than 250:1.

23. The process of claim 18, wherein the target molar ratio of the aluminoxane to the organoboron compound is less than 100:1.

24. The process of claim 18, wherein the target molar ratio of the aluminoxane to the organoboron compound is less than 25:1.

25. The process of claim 18, wherein the molar ratio of the aluminoxane to the combination of the organoboron compound and the metallocene is less than 125:1.

26. The process of claim 18, wherein the molar ratio of the aluminoxane to the combination of the organoboron compound and the metallocene is less than 50:1.

27. The process of claim 18, wherein the molar ratio of the aluminoxane to the combination of the organoboron compound and the metallocene is less than 12.5:1.

28. The process of claim 18, wherein the molar ratio of the organoboron compound to the metallocene is from 0.3:1 to 4:1.

29. The process of claim 18, wherein the molar ratio of the organoboron compound to the metallocene is from 0.6:1 to 2:1.

30. The process of claim 18, wherein the desired kinematic viscosity is less than 400 centiStokes.

31. The process of claim 18, wherein the desired kinematic viscosity is less than 300 centiStokes.

32. The process of claim 18, wherein the metallocene is a compound of the formula:

$$(Cp^1R^1{}_m)R^3(Cp^2R^2{}_p)MX_q$$

wherein $Cp^1$ of ligand $(Cp^1R^1{}_m)$ and $Cp^2$ of ligand $(Cp^2R^2{}_p)$ are the same or different cyclopendadienyl rings;

$R^1$ and $R^2$ each is, independently, a hydrocarbyl, halocarbyl, heterocarbyl, hydrocarbyl-substituted organometalloid or halocarbyl substituted organometalloid group containing up to 20 carbon atoms;

m is an integer from 0 to 5;

p is an integer from 0 to 5;

two $R^1$ and/or $R^2$ substituents on adjacent carbon atoms of the cyclopentadienyl ring associated therewith can be joined together to form a ring fused to the cyclopentadienyl ring, the fused ring containing from 4 to 20 carbon atoms;

$R^3$ is a bridging group bridging $Cp^1$ and $Cp^2$;

M is a transition metal having a valence of from 3 to 6;

each X is a non-cyclopentadienyl ligand and is, independently, halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to 20 carbon atoms; and q is equal to the valence of M minus 2.

33. The process of claim 18, wherein the metallocene catalyst is a catalyst selected from the group consisting of diphenylmethylene(indenyl)(fluorenyl)zirconium dichloride; diphenylmethylene(cyclopentadienyl-9-fluorenyl)zirconium dichloride; diphenylmethylene(3-methyl-cyclopentadienyl-9-fluorenyl)zirconium dichloride; diphenylmethylene(3-ethyl-cyclopentadienyl-9-fluorenyl)zirconium dichloride; diphenylmethylene(3-propyl-cyclopentadienyl-9-fluorenyl)zirconium dichloride; diphenylmethylene(3-butyl-cyclopentadienyl-9-fluorenyl)zirconium dichloride; diphenylmethylene(cyclopentadienyl-indenyl)zirconium dichloride; diphenylmethylene(cyclopentadienyl)(4,5,6,7-tetrahydro-indenyl)zirconium dichloride; diphenylmethylene(cyclopentadienyl)(2-methylindenyl)zirconium dichloride; diphenylmethylene(cyclopentadienyl)(2-phenylindenyl)zirconium dichloride; diphenylmethylene(2,4-dimethylcyclo-pentadienyl)(3',5'-dimethylcyclopentadienyl)zirconium dichloride; diphenylmethylene(2-methyl-4-tert-butylcyclo-pentadienyl)(3'-tert-butyl-5'-methylcyclopentadienyl)zirconium dichloride; dixylylmethylene(2,3,5-trimethylcyclopentadienyl)(2',4',5'-trimethylcyclopentadienyl)zirconium dichloride; dixylylmethylene(2,4-dimethylcyclopentadienyl)(3',5'-dimethylcyclopentadienyl)zirconium dichloride; dixylylmethylene(2-methyl-4-tert-butylcyclopentadienyl)(3'-tert-butyl-5-methylcyclopentadienyl)zirconium dichloride; dixylylmethylene(cyclopentadienyl)(fluorenyl)zirconium dichloride; di-o-tolylmethylene(cyclopentadienyl)(3,4-dimethyl-cyclopentadienyl)zirconium dichloride; di-o-tolylmethylene(cyclopentadienyl)(3,4-dimethyl-cyclopentadienyl) zirconium dichloride; di-o-tolylmethylene (cyclopentadienyl)(3,4-dimethylcyclopentadienyl) zirconium dichloride; di-o-tolylmethylene (cyclopentadienyl)(indenyl)zirconium dichloride; dibenzylmethylene(cyclopentadienyl)(tetramethylcyclopentadienyl)zirconium dichloride; dibenzylmethylene(cyclopentadienyl)(indenyl)zirconium dichloride; dibenzylmethylene(cyclopentadienyl)(fluorenyl)zirconium dichloride; dicyclohexylmethylene(cyclopentadienyl)(indenyl)zirconium dichloride; dicyclohexyl(cyclopentadienyl)(fluorenyl) zirconium dichloride; dicyclohexylmethylene(2-methylcyclopentadienyl)(fluorenyl)zirconium dichloride; diphenylsilyl(2,4-dimethylcyclopentadienyl)(3',5'-dimethylcyclopentadienyl)zirconium dichloride; diphenylsilyl(2,4-dimethylcyclopentadienyl)(3',5'-dimethyl-cyclopentadienyl) zirconium dichloride; diphenylsilyl(2,3,5-trimethylcyclopentadienyl)(2,4,5-trimethylcyclopentadienyl)zirconium dichloride; tetraphenyldisilyl(cyclopentadienyl)(indenyl)zirconium dichloride; tetraphenyldisilyl(3-methylcyclopentadienyl)(indenyl)zirconium dichloride; tetraphenyldisilyl(cyclopentadienyl)(fluorenyl)zirconium dichloride; di-o-tolylsilyl(cyclopentadienyl)(trimethylcyclopentadienyl)zirconium dichloride; di-o-tolylsilyl(cyclopentadienyl)(tetramethylcyclopentadienyl)zirconium dichloride; di-o-tolylsilyl(cyclopentadienyl)(3,4-dimethylcyclopentadienyl)zirconium dichloride; di-o-tolylsilyl(cyclopentadienyl)(trimethylcyclopentadienyl)zirconium dichloride; dibenzylsilyl(cyclopentadienyl)(fluorenyl)zirconium dichloride; dibenzylsilyl(cyclopentadienyl)(2,7-di-t-butyl-fluorenyl)zirconium dichloride; and dicyclohexylsilyl(cyclopentadienyl)(fluorenyl)zirconium dichloride.

34. The process of claim 18, wherein the aluminoxane is an alkylaluminoxane.

35. The process of claim 18, wherein the aluminoxane is triisobutylaluminoxane.

36. The process of claim 18, wherein the aluminoxane is methylaluminoxane.

37. The process of claim 18, wherein the organoboron compound is selected from the group consisting of lithium tetrakis(pentafluorophenyl)borate, lithium tetrakis(trifluoromethylphenyl)borate, lithium tetrakis(3,5-di{trifluoromethyl}phenyl)borate, sodium tetrakis(pentafluorophenyl)borate, potassium tetrakis(pentafluorophenyl)borate, magnesium tetrakis(pentafluorophenyl)borate, titanium tetrakis(pentafluorophenyl)borate, tin tetrakis(pentafluorophenyl)borate, and dimethylanilinium tetrakis(pentafluorophenyl)borate.

38. The process of claim 18, wherein the $C_3$-$C_{12}$ monomer is 1-decene.

39. The process of claim 18, wherein the at least one monomer further comprises propene.

40. A process for forming a polyalphaolefin having a desired kinematic viscosity of less than 500 cSt at 100° C.

using ASTM D-445 from at least one $C_8$-$C_{12}$ monomer in the presence of an aluminoxane, a metallocene, and an organoboron compound, the process comprising the steps of:
  (a) providing a correlation between (i) the molar ratio of the aluminoxane to the combination of the metallocene and the organoboron compound, and (ii) the kinematic viscosity of the polyalphaolefin;
  (b) determining, from the correlation, a target molar ratio of the aluminoxane to the combination of the metallocene and the organoboron compound that will yield a desired kinematic viscosity of the polyolefin;
  (c) forming a reaction mixture comprising the at least one monomer, the aluminoxane, the metallocene and the organoboron compound, wherein the relative molar ratio of the aluminoxane to the combination of the metallocene and the organoboron compound in the reaction mixture corresponds to the target molar ratio; and
  (d) polymerizing the at least one monomer in the reaction mixture to form the polyalphaolefin having the desired kinematic viscosity.

41. The process of claim 40, wherein the target molar ratio is less than 125:1.

42. The process of claim 40, wherein the target molar ratio is less than 50:1.

43. The process of claim 40, wherein the target molar ratio is less than 25:1.

44. The process of claim 40, wherein the target molar ratio is less than 12.5:1.

45. The process of claim 40, wherein the molar ratio of the aluminoxane to the metallocene is less than 100:1.

46. The process of claim 40, wherein the molar ratio of the aluminoxane to the organoboron compound is less than 100:1.

47. The process of claim 40, wherein the molar ratio of the organoboron compound to the metallocene is from 0.6:1 to 2:1.

48. The process of claim 40, wherein the desired kinematic viscosity is less than 300 centiStokes.

49. The process of claim 40, wherein the metallocene is a compound of the formula:

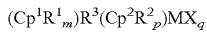

$$(Cp^1R^1_m)R^3(Cp^2R^2_p)MX_q$$

wherein $Cp^1$ of ligand $(Cp^1R^1_m)$ and $Cp^2$ of ligand $(Cp^2R^2_p)$ are the same or different cyclopendadienyl rings;
  $R^1$ and $R^2$ each is, independently, a hydrocarbyl, halocarbyl, heterocarbyl, hydrocarbyl-substituted organometalloid or halocarbyl substituted organometalloid group containing up to 20 carbon atoms;
  m is an integer from 0 to 5;
  p is an integer from 0 to 5;
  two $R^1$ and/or $R^2$ substituents on adjacent carbon atoms of the cyclopentadienyl ring associated therewith can be joined together to form a ring fused to the cyclopentadienyl ring, the fused ring containing from 4 to 20 carbon atoms;
  $R^3$ is a bridging group bridging $Cp^1$ and $Cp^2$;
  M is a transition metal having a valence of from 3 to 6;
  each X is a non-cyclopentadienyl ligand and is, independently, halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to 20 carbon atoms; and
  q is equal to the valence of M minus 2.

50. The process of claim 40, wherein the metallocene catalyst is a catalyst selected from the group consisting of diphenylmethylene(indenyl)(fluorenyl)zirconium dichloride; diphenylmethylene(cyclopentadienyl-9-fluorenyl)zirconium dichloride; diphenylmethylene(3-methyl-cyclopentadienyl-9-fluorenyl)zirconium dichloride; diphenylmethylene(3-ethyl-cyclopentadienyl-9-fluorenyl)zirconium dichloride; diphenylmethylene(3-butyl-cyclopentadienyl-9-fluorenyl)zirconium dichloride; diphenylmethylene(3-butyl-cyclopentadienyl-9-fluorenyl)zirconium dichloride; diphenylmethylene(cyclopentadienyl-indenyl)zirconium dichloride; diphenylmethylene(cyclopentadienyl)(4,5,6,7-tetrahydro-indenyl)zirconium dichloride; diphenylmethylene(cyclopentadienyl)(2-methylindenyl)zirconium dichloride; diphenylmethylene(cyclopentadienyl)(2-phenylindenyl)zirconium dichloride; diphenylmethylene(2,4-dimethylcyclo-pentadienyl)(3',5'-dimethylcyclopentadienyl)zirconium dichloride; diphenylmethylene(2-methyl-4-tert-butylcyclo-pentadienyl)(3'-tert-butyl-5'-methylcyclopentadienyl)zirconium dichloride; dixylylmethylene(2,3,5-trimethylcyclopentadienyl)(2',4',5' trimethylcyclopentadienyl)zirconium dichloride; dixylylmethylene(2,4-dimethylcyclopentadienyl)(3,5'-dimethylcyclopentadienyl)zirconium dichloride; dixylylmethylene(2-methyl-4-tert-butylcyclopentadienyl)(3'-tert-butyl-5-methylcyclopentadienyl)zirconium dichloride; dixylylmethylene(cyclopentadienyl)(fluorenyl)zirconium dichloride; di-o-tolylmethylene(cyclopentadienyl)(3,4-dimethyl-cyclopenta dienyl)zirconium dichloride; di-o-tolylmethylene(cyclopentadienyl)(3,4-dimethyl-cyclopentadienyl) zirconium dichloride; di-o-tolylmethylene (cyclopentadienyl)(3,4-dimethylcyclopentadienyl) zirconium dichloride; di-o-tolylmethyl ene (cyclopentadienyl)(indenyl)zirconium dichloride; dibenzylmethylene(cyclopentadienyl)(tetramethylcyclopentadienyl)zirconium dichloride; dibenzylmethylene(cyclopentadienyl)(indenyl)zirconium dichloride; dibenzylmethylene(cyclopentadienyl)(fluorenyl)zirconium dichloride; dicyclohexylmethylene(cyclopentadienyl)(indenyl)zirconium dichloride; dicyclohexyl(cyclopentadienyl)(fluorenyl)zirconium dichloride; dicyclohexylmethylene(2-methylcyclopentadienyl)(fluorenyl)zirconium dichloride; diphenylsilyl(2,4-dimethylcyclopentadienyl)(3',5'-dimethylcyclopentadienyl)zirconium dichloride; diphenylsilyl(2,4-dimethylcyclopentadienyl)(3',5'-dimethyl-cyclopentadienyl)zirconium dichloride; diphenylsilyl(2,3,5-trimethylcyclopentadienyl)(2,4,5-trimethylcyclopentadienyl)zirconium dichloride; tetraphenyldisilyl(cyclopentadienyl)(indenyl)zirconium dichloride; tetraphenyldisilyl(3-methylcyclopentadienyl)(indenyl)zirconium dichloride; tetraphenyldisilyl(cyclopentadienyl)(fluorenyl)zirconium dichloride; di-o-tolylsilyl(cyclopentadienyl)(trimethylcyclopentadienyl)zirconium dichloride; di-o-tolylsilyl(cyclopentadienyl)(tetramethylcyclopentadienyl)zirconium dichloride; di-o-tolylsilyl(cyclopentadienyl)(3,4-dimethylcyclopentadienyl)zirconium dichloride; di-o-tolylsilyl(cyclopentadienyl)(triethylcyclopentadienyl)zirconium dichloride; dibenzylsilyl(cyclopentadienyl)(fluorenyl)zirconium dichloride; dibenzylsilyl(cyclopentadienyl)(2,7-di-t-butyl-fluorenyl)zirconium dichloride; and dicyclohexylsilyl(cyclopentadienyl)(fluorenyl)zirconium dichloride.

51. The process of claim 40, wherein the aluminoxane is methylaluminoxane.

52. The process of claim 40, wherein the organoboron compound is selected from the group consisting of lithium tetrakis(pentafluorophenyl)borate, lithium tetrakis(trifluoromethylphenyl)borate, lithium tetrakis(3,5-di{trifluoromethyl}phenyl)borate, sodium tetrakis(pentafluorophenyl)borate, potassium tetrakis(pentafluorophenyl)borate, magnesium tetrakis(pentafluorophenyl)borate, titanium tetrakis(pentafluorophenyl)borate, tin tetrakis(pentafluorophenyl)borate, and dimethylanilinium tetrakis(pentafluorophenyl)borate.

53. The process of claim 40, wherein the $C_8$-$C_{12}$ monomer is 1-decene.

54. The process of claim 40, wherein the at least one monomer further comprises propene.

55. A process for forming a polyalphaolefin having a desired kinematic viscosity of less than 500 cSt at 100° C. using ASTM D-445 from at least one $C_8$-$C_{12}$ monomer in the presence of an aluminoxane, a metallocene, and an organoboron compound, the process comprising the steps of:
 (a) providing a correlation between (i) the molar ratio of the aluminoxane to the organoboron compound, and (ii) the kinematic viscosity of the polyalphaolefin;
 (b) determining, from the correlation, a target molar ratio of the aluminoxane to the organoboron compound that will yield a desired kinematic viscosity of the polyolefin;
 (c) forming a reaction mixture comprising the at least one monomer, the aluminoxane, the metallocene and the organoboron compound, wherein the relative molar ratio of the aluminoxane to the organoboron compound in the reaction mixture corresponds to the target molar ratio; and
 (d) polymerizing the at least one monomer in the reaction mixture to form the polyalphaolefin having the desired kinematic viscosity.

56. The process of claim 55, wherein the target molar ratio is less than 250:1.

57. The process of claim 55, wherein the target molar ratio is less than 100:1.

58. The process of claim 55, wherein the target molar ratio is less than 25:1.

* * * * *